Oct. 4, 1938.  H. G. SCHAEFER  2,131,760
VEHICLE
Filed June 5, 1934  3 Sheets-Sheet 2
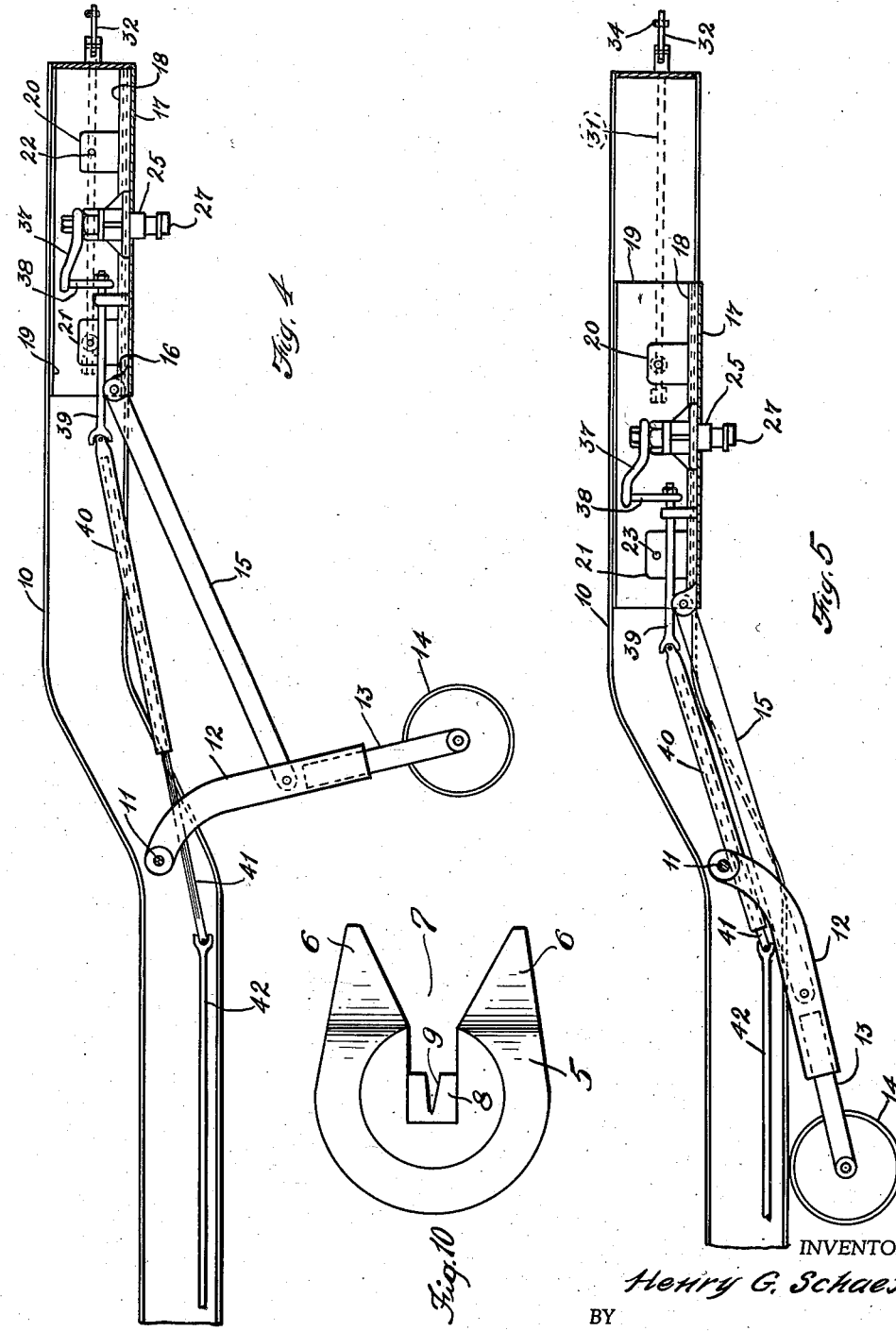
INVENTOR.
Henry G. Schaefer
BY
Bays Oberlin & Bay
ATTORNEYS.

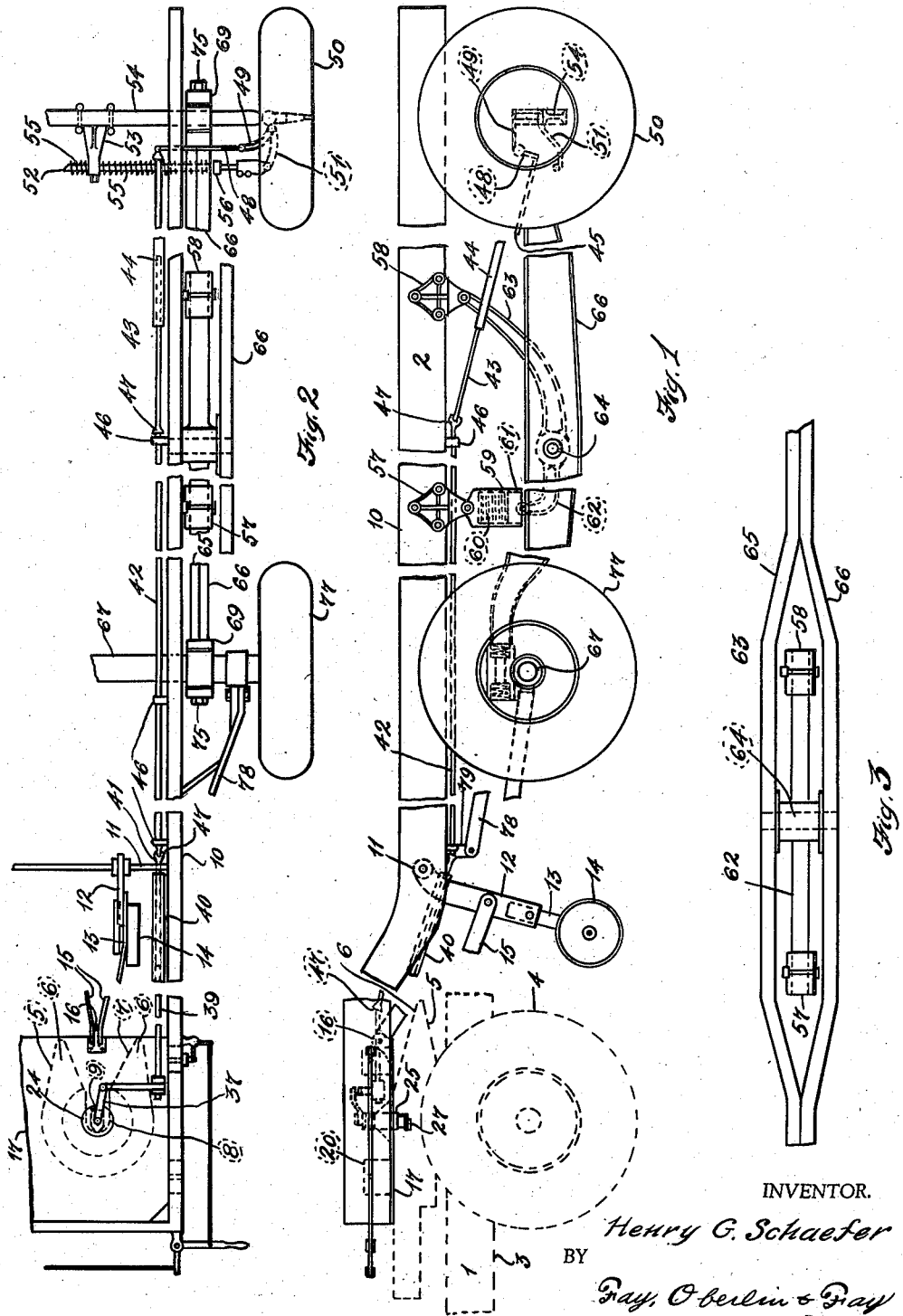
Oct. 4, 1938.  H. G. SCHAEFER  2,131,760
VEHICLE
Filed June 5, 1934   3 Sheets-Sheet 1
INVENTOR.
Henry G. Schaefer
BY
Fay, Oberlin & Fay
ATTORNEYS.

Oct. 4, 1938.  H. G. SCHAEFER  2,131,760
VEHICLE
Filed June 5, 1934   3 Sheets-Sheet 3
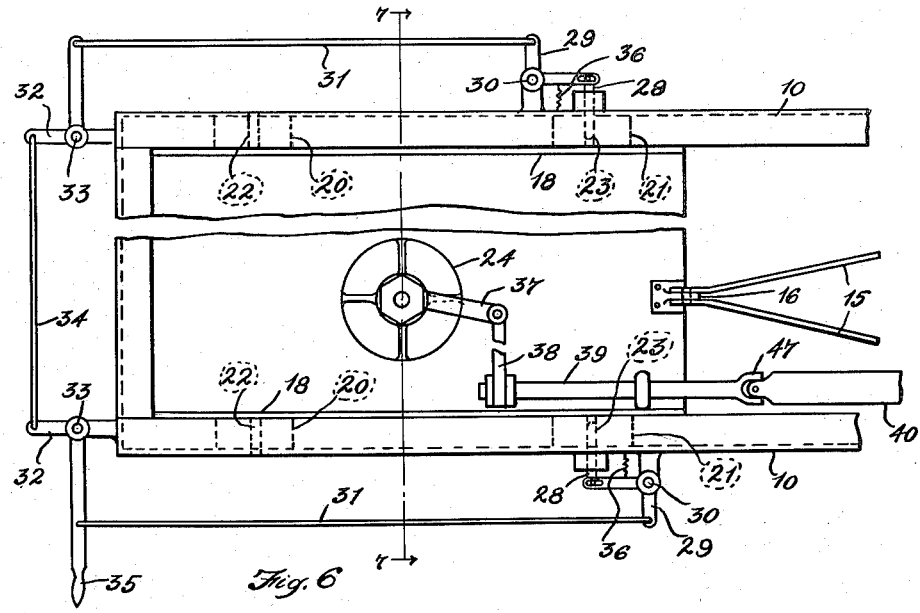
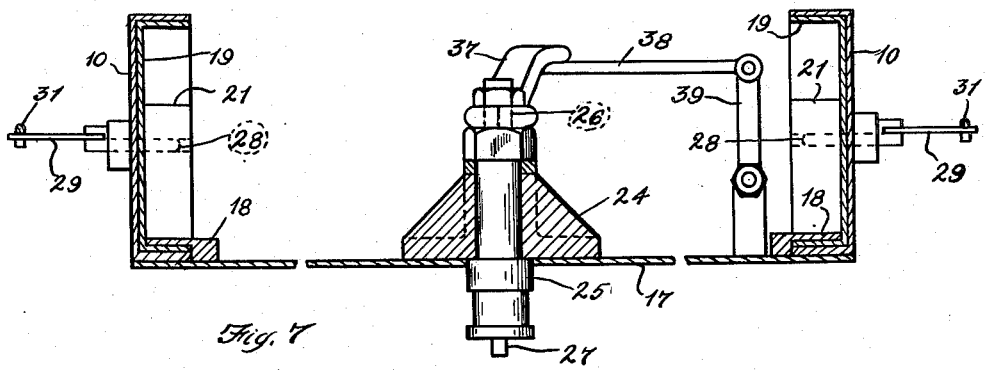
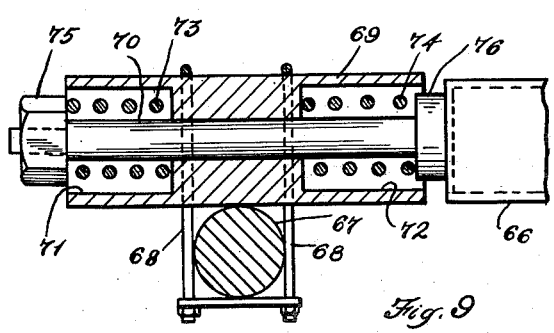
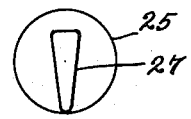
INVENTOR.
Henry G. Schaefer
BY
Pays Oberlin & Gray
ATTORNEYS Patented Oct. 4, 1938

2,131,760

UNITED STATES PATENT OFFICE 2,131,760

VEHICLE

Henry G. Schaefer, Lakewood, Ohio, assignor to Convertible Truck and Trailer Company, Lakewood, Ohio, a corporation of Ohio Application June 5, 1934, Serial No. 729,045

5 Claims. (Cl. 280—33.55)

The present invention relates as indicated to vehicles, but has more particular reference to that type of commercial vehicle which includes a tractor and a semi-trailer.

A primary object of the invention is to provide a vehicle of the character described in which the wheeled supports with which the semi-trailer is usually provided are actuated in response to movement of one of the coupling elements of the tractor and trailer by the other of such coupling elements.

Another object of the invention is to provide a vehicle of the character described in which certain of the rear wheels of the semi-trailer are steered in response to angular displacement of the trailer coupling element when the tractor is steered, whereby a shorter turning radius of the vehicle is secured, jack-knifing is avoided, tire wear is lessened, the operation and control of the vehicle made easier, and other ancillary advantages are secured.

A further object of the invention is to provide a vehicle of the character described in which the loads are evenly and properly distributed over the wheels of the vehicle, regardless of the contour of the roads over which the vehicle is travelling and in which the transmission of excessive stresses to the frame of the vehicle is avoided and the useful life of the vehicle is considerably prolonged.

To the accomplishment of the foregoing and related ends, said invention then consists of the means hereinafter fully described and particularly pointed out in the claims; the annexed drawings and the following description setting forth in detail a preferred form of construction embodying the invention, such disclosed means constituting, however, but one of various construction forms in which the principle of the invention may be embodied.

In said annexed drawings:

Fig. 1 is a fragmentary side elevation of a vehicle embodying the invention; Fig. 2 is a fragmentary plan view of one side of the vehicle shown in Fig. 1; Fig. 3 is a fragmentary plan view of one of the sub-frames of the trailer; Fig. 4 is an enlarged longitudinal cross-sectional view of the front end of the trailer, showing the wheeled supports in operative position; Fig. 5 is a view similar to Fig. 4 but showing the wheeled supports in inoperative position; Fig. 6 is a fragmentary plan view of the trailer fifth wheel and associated structure; Fig. 7 is a cross-sectional view taken on a line substantially indicated by the line 7—7 of Fig. 6; Fig. 8 is a plan view of the lower end of the trailer coupling pin; Fig. 9 is a detail, cross-sectional view showing the manner in which the sub-frames are mounted on the trailer axles, and Fig. 10 is a plan view of the tractor fifth wheel.

Referring more particularly to the drawings, it will be seen that the vehicle is of the commercial type and comprises a motor driven tractor generally designated 1 and a semi-trailer generally designated 2 adapted to be coupled therewith. Mounted on the frame 3 of the tractor directly above the rear wheels 4 thereof is a fifth wheel 5. This fifth wheel is of a type commonly found in vehicles of this character, being characterized by the fact that it has a limited degree of pivotal movement about an axis transverse to the direction of movement of the tractor, providing in effect a pivotal mounting for the forward end of the semi-trailer to which it is coupled; has rearwardly extending inclined surfaces 6, whereby when the tractor is backed rearwardly under the forward end of the trailer, the trailer body is elevated sufficiently to raise the wheeled supports with which the latter is provided slightly off the ground; and has a V-shaped recess 7 which the coupling pin of the trailer is adapted to enter. It differs from the usual type of fifth wheel in that it is provided at its center with a non-rotatable block 8 having a V-shaped recess 9 therein opening toward the rear end of the tractor.

The semi-trailer 2 comprises a frame which includes transversely spaced channels 10, the forward ends of which are offset vertically to provide ample space for the rear end of the tractor. Channels 10 have pivotally mounted thereon as on a cross bar 11, levers 12 which carry arms 13 which in turn support wheels 14. Pivoted to the levers 12 intermediate the ends are links 15, the other ends of which are pivoted to an ear 16 which is rigidly secured to the plate 17 of the trailer fifth wheel. The plate 17 is slidably mounted on the channels 10, being secured as by gibs 18 to channels 19 which have a sliding fit within channels 10 and are movable longitudinally thereof. The channels 19 have rigidly secured thereto at longitudinally spaced points, blocks 20 and 21 which are respectively provided with recesses 22 and 23 and serve a purpose to be presently described.

Disposed at the center of the plate 17 is a bearing 24 which is welded or otherwise secured to the plate and rotatably mounted within said bearing is the trailer coupling pin 25. Pin 25 is provided adjacent its upper end with a squared portion 26 and on its lower end with a wedge block 27 which is adapted to enter a V-shaped recess 9 in the block 8 when the tractor is backed under the trailer during the coupling. When the trailer is to be coupled to the tractor, the brakes are applied to the rear wheels of the trailer and the tractor is backed under the trailer, the trailer body during this movement being elevated sufficiently by the inclined surfaces 6 of the tractor fifth wheel to raise the wheels 14 of the wheeled supports about two inches from the ground. After the coupling pin 25 of the trailer is engaged by the block 8 of the tractor fifth wheel, the pin is locked to such block by means (not shown) which is commonly found in devices of this character, such, for example, as that shown in Figs. 4 and 5 of the French patent to Jagenberg No. 355,154, or by automatically operated locking means. At this point, locking pins 28, which extend into recesses 23 in blocks 21 and thus lock the trailer fifth wheel in the position shown in Figs. 4 and 6, are retracted from these blocks by suitable mechanism. This mechanism as shown in Fig. 6 comprises bell-crank levers 29 which are pivoted as at 30 to the channels 10, connecting rods 31, bell-crank levers 32, pivoted as at 33 to channels 10, and a rod 34 interconnecting levers 32. One of the levers 32 is provided with a handle 35 for effecting retraction of the locking pins, and springs 36 are provided for normally urging the pins to locking position. With the pins 28 thus retracted, continued rearward movement of the tractor results in a swinging of the wheeled supports to their inoperative position shown in Fig. 5. During this movement, the handle 35 may be released and when the recesses 22 in the blocks 20 become aligned with the pins 28 the latter automatically enter these recesses, thus locking the fifth wheel of the trailer against longitudinal movement and maintaining the wheeled supports in inoperative position. The trailer is now coupled and ready to be drawn by the tractor.

Means have also been provided for communicating the steering effect of the tractor to the rear wheels of the trailer through the coupling pin of the trailer. For this purpose, the squared portion 26 of the coupling pin 25 has secured thereto a lever 37, which is secured at its other end to a transverse lever 38. Lever 38 is connected to a torque rod consisting of a member 39, sleeve 40, members 41, 42 and 43, sleeve 44 and member 45. The torque rod is mounted in suitable bearings 46 extending from one of the channels 10. The members 41 and 43 have a splined connection with the sleeves 40 and 44 respectively, while the remaining connections are in the form of universal joints 47. The splined connection between sleeve 40 and member 41 permits movement of the trailer fifth wheel to the position shown in Fig. 5. The member 45 of the torque rod is connected to a lever 48, which in turn is secured to an operating lever 49, movement of which steers the wheel 50 at the rear of the trailer. The steering effect is communicated to the opposite wheel (not shown) through a lever 51 and tie rod 52 which passes through a bracket 53 secured to the axle 54. Coil springs 55, disposed between the bracket 53 and collars 56 on the tie rod, serve to prevent turning of the rear wheels in case of breakage of one of the elements of the steering mechanism and also tend to prevent shimmying of the rear wheels.

It will be apparent from the foregoing description that when the tractor is turning, as in going around a corner, the turning effect of the tractor is communicated to the rear wheels of the trailer through the wedge block 27, coupling pin 25, levers 37 and 38, and torque rod. Variations in the center to center distance between the wheels 4 of the tractor and the rear wheels 50 of the trailer, due to passage of the front or rear wheels over ruts or obstructions in the road, will be compensated for by the splined connection between the sleeve 44 and member 45 of the torque rod, so that steering may be effected at all times without danger of the torque rod binding in its bearings 46. By the use of a rear wheel steering mechanism, such as described, the vehicle may be steered within a much smaller radius than has heretofore been possible in commercial vehicles of this type, tire wear is considerably lessened, danger of jack-knifing is avoided and the operation and control of the vehicle is made easier.

Means have also been provided for securing an even and proper distribution of the loads over the wheels of the vehicle, regardless of the contour of the roads over which the vehicle is travelling, and for avoiding the transmission of excessive stresses to the body of the vehicle so as to prolong the useful life of the vehicle. These objects are accomplished to some degree as a result of the limited degree of the pivotal movement of the tractor fifth wheel about an axis transverse to the direction of movement of the tractor. They are accomplished principally, however, by the mounting of the rear end of the trailer frame. As shown in Figs. 1, 2 and 3, the channels 10 of the trailer frame have secured thereto at longitudinally spaced points hangers 57 and 58. Pivotally secured to hangers 57 is a shock-absorber comprising a housing 59, coil spring 60 and piston 61. Piston 61 is pivotally secured to a cantilever arm 62 which is integral with a second cantilever arm 63 pivotally secured to the hanger 58. The cantilever arms 62 and 63 at their point of junction are pivotally mounted on a stub shaft 64 which is carried by a sub-frame consisting of a pair of channels 65 and 66. These channels are spread apart intermediate their ends to accommodate the cantilever arms and are mounted on the rear axle 54 and the front axle 67 of the trailer in a manner which is clearly shown in Figs. 1, 2 and 9. As shown in Fig. 9, each axle has rigidly clamped thereto, as by means of U-bolts 68, a hanger 69 which forms a bearing for a stub shaft 70 which is welded or otherwise secured to the channels 65 and 66 of the sub-frame. The hanger is provided in its ends with recesses 71 and 72, within which are disposed coil springs 73 and 74. Spring 73 is in abutment with the hanger and a nut 75 secured to the stub shaft 70 and spring 74 is in abutment with the hanger and an enlargement 76 on the stub shaft 70. This manner of mounting the sub-frames not only provides a resilient cushion for absorbing longitudinal stresses between the sub-frames and axles, but also permits the sub-frames to oscillate to a slight degree transversely of the direction of movement of the vehicle. In addition, pivotal mounting of the trailer body on the sub-frames is effective to prevent the transmission of excessive stresses from the sub-frames to the main frame of the trailer.

Coupled to the axle 67 of the front wheels 77 of the trailer is a wishbone 78 which is secured as at 79 to the main frame of the trailer. This wishbone maintains the sub-frames and wheels 77 parallel to the body chassis or frame when the vehicle is being turned.

This application is a continuation-in-part of my copending application Serial No. 679,695, filed July 10, 1933.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a tractor-trailer, a tractor provided with a fifth wheel having a block rigidly associated therewith, said block having a V-shaped recess therein; a trailer having a fifth wheel provided with a rotatable coupling pin having a wedge portion adapted to enter said recess, and means including said coupling pin for communicating angular displacement of said block to the rear wheels of the trailer for steering the latter.

2. In a tractor trailer, a tractor provided with a fifth wheel, a trailer having a fifth wheel mounted for slidable movement longitudinally of the trailer, said trailer fifth wheel having a coupling pin for coupling the tractor and trailer, and means for communicating the steering effect of said tractor to the rear wheels of the trailer, said means including said coupling pin and means operable by said coupling pin to steer said rear wheels.

3. In a tractor trailer, a tractor provided with a fifth wheel, a trailer having a fifth wheel mounted for slidable movement longitudinally of the trailer, said fifth wheel having a coupling pin for coupling the tractor and trailer, and means for communicating the steering effect of said tractor to the rear wheels of the trailer irrespective of the position of the trailer fifth wheel, said means including said coupling pin and splined members operable by said coupling pin to steer said rear wheels.

4. A trailer comprising a frame, a fifth wheel mounted thereon, a bearing block mounted on said fifth wheel, a coupling pin disposed within said bearing, said pin having its axis vertical and being rotatable upon its axis, wheels for supporting the rear end of said trailer and means responsive to rotation of said coupling pin about its axis for steering said wheels.

5. A trailer comprising a frame, a fifth wheel mounted thereon and slidable longitudinally thereof, a bearing block mounted on said fifth wheel, a coupling pin disposed within said bearing, said pin having its axis vertical and being rotatable upon its axis, wheels for supporting the rear end of said trailer and means responsive to rotation of said coupling pin about its axis for steering said wheels.

HENRY G. SCHAEFER.